US008580064B2

(12) United States Patent  
Jannot et al.

(10) Patent No.: US 8,580,064 B2  
(45) Date of Patent: *Nov. 12, 2013

(54) PROCESS FOR FASTENING AN ACCESSORY TO A PLASTIC HOLLOW BODY DURING THE MOLDING THEREOF AND A CONNECTION PIECE

(75) Inventors: Frederic Jannot, Bousval (BE); Bjorn Criel, Sint-Martens-Lennik (BE); Pierre-Francois Tardy, Brussels (BE); Ralph Pohlmann, Margny-les-Compiegne (FR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 191 days.

This patent is subject to a terminal disclaimer.

(21) Appl. No.: 13/057,185

(22) PCT Filed: Aug. 6, 2009

(86) PCT No.: PCT/EP2009/060195  
§ 371 (c)(1),  
(2), (4) Date: Feb. 2, 2011

(87) PCT Pub. No.: WO2010/015670  
PCT Pub. Date: Feb. 11, 2010

(65) Prior Publication Data  
US 2011/0131771 A1    Jun. 9, 2011

(30) Foreign Application Priority Data  
Aug. 7, 2008 (FR) .................................... 08 55458

(51) Int. Cl.  
*F16B 2/20* (2006.01)  
*B29C 65/70* (2006.01)  
*B23P 11/02* (2006.01)

(52) U.S. Cl.  
USPC .................. 156/245; 156/66; 24/571; 29/453

(58) Field of Classification Search  
USPC ........................................................ 156/245  
See application file for complete search history.

(56) References Cited

U.S. PATENT DOCUMENTS 6,527,892 B1    3/2003    Gombert et al.  
6,726,967 B2    4/2004    Vorenkamp et al.  
(Continued)

FOREIGN PATENT DOCUMENTS

DE          10010900 A1      9/2001  
DE     102006006469 A1 *    8/2007  
(Continued)

OTHER PUBLICATIONS

U.S. Appl. No. 13/059,146, filed Feb. 15, 2011, Ralph Pohlman, et al.

(Continued)

*Primary Examiner* — Philip Tucker  
*Assistant Examiner* — Vicki Wu  
(74) *Attorney, Agent, or Firm* — Oblon, Spivak, McClelland, Maier & Neustadt, L.L.P.

(57) ABSTRACT

Process for fastening an accessory to a hollow body obtained by molding a molten plastic parison and using a plastic connector comprising coupling means for the accessory and a stop surface intended to limit the penetration of the connector into the molten plastic, according to which the stop surface is provided with a curved double lip (or one-piece part having two concentric curved edges, i.e., two protuberances located preferably at its periphery, which are concentric and are in relief relative to the remainder of the part) and the connector is welded to the inner wall of the parison using this double lip.

9 Claims, 1 Drawing Sheet

(56) References Cited

U.S. PATENT DOCUMENTS

| | | |
|---|---|---|
| 7,131,452 B2 | 11/2006 | Potter et al. |
| 2001/0015513 A1 | 8/2001 | Schaftingen et al. |
| 2002/0020487 A1* | 2/2002 | Vorenkamp et al. ..... 156/244.19 |
| 2005/0205156 A1 | 9/2005 | Ganachaud et al. |
| 2008/0149642 A1* | 6/2008 | Borchert et al. ............ 220/562 |
| 2011/0139342 A1* | 6/2011 | Jannot et al. .................. 156/92 |

FOREIGN PATENT DOCUMENTS

| | | |
|---|---|---|
| EP | 1099529 A1 | 5/2001 |
| EP | 1110697 A2 | 6/2001 |
| GB | 1410215 A | 10/1975 |
| JP | 8192457 A | 7/1996 |
| WO | WO 20040024487 A1 | 3/2004 |
| WO | WO 2006008308 A1 * | 1/2006 |
| WO | WO 20100015615 A1 | 2/2010 |
| WO | WO 20100015673 A1 | 2/2010 |
| WO | WO 20100023212 A2 | 3/2010 |

OTHER PUBLICATIONS

U.S. Appl. No. 13/057,180, filed Feb. 2, 2011, Frederic Jannot, et al.

U.S. Appl. No. 13/057,203, filed Feb. 2, 2011, Frederic Jannot, et al.

\* cited by examiner

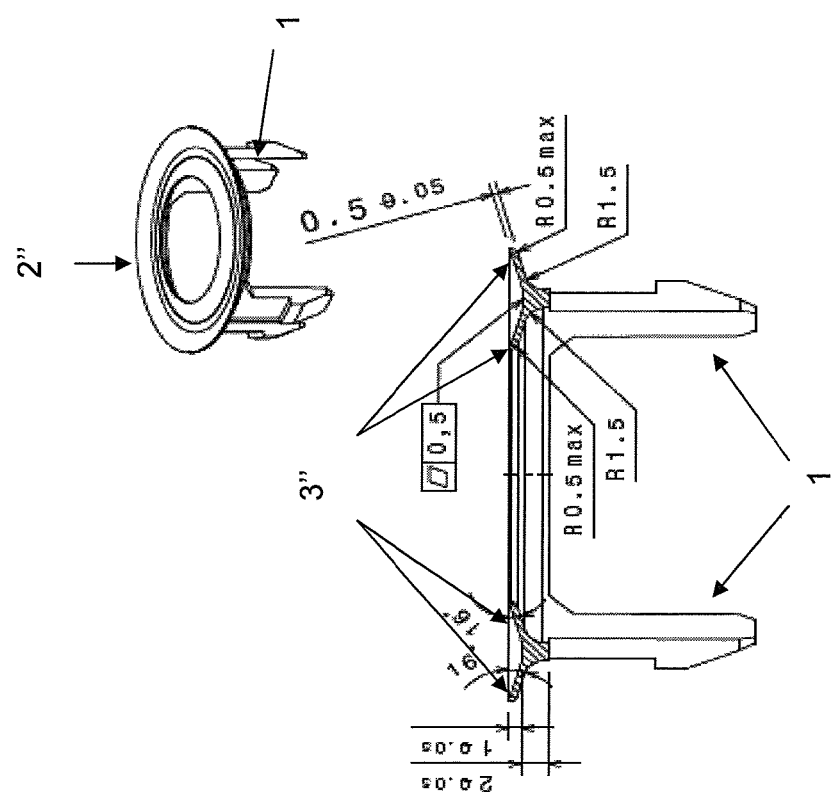

PROCESS FOR FASTENING AN ACCESSORY TO A PLASTIC HOLLOW BODY DURING THE MOLDING THEREOF AND A CONNECTION PIECE

CROSS-REFERENCE TO RELATED APPLICATIONS

This application is a U.S. national stage application under 35 U.S.C. §371 of International Application No. PCT/EP2009/060195 filed Aug. 6, 2009, which claims priority to French Application No. FR 08.55458 filed Aug. 7, 2008, this application being herein incorporated by reference in its entirety for all purposes.

TECHNICAL FIELD OF THE INVENTION

The present invention relates to a process for fastening an accessory to a plastic hollow body (and in particular, a hollow body intended for a motor vehicle) during the manufacture, by molding, thereof and using a particular connector.

BACKGROUND OF THE INVENTION

Fuel tanks on board vehicles of various kinds generally have to meet sealing and permeability standards in relation to the type of use for which they are designed and the environmental requirements that they have to satisfy. At the present time, both in Europe and throughout the world, there is a substantial tightening of the requirements regarding the limitation of pollutant emissions into the atmosphere and into the environment in general.

To limit these emissions, care is taken in particular to position the accessories (ventilation lines, valves, baffles, stiffeners, etc.) inside the tank and/or the fill pipe (see in particular Application WO 2004/024487 in the name of the Applicant). However, when these components are fastened to the tank after it has been molded, it is generally necessary to make at least one opening in the tank so as to be able to introduce said components into the tank and to fasten them thereto. Hence there may be potential sealing problems near this opening.

Several years ago the Applicant therefore developed a process of initially molding a cut parison (cut into two sections) in order to be able to introduce thereinto and fasten thereto accessories during the actual molding of the tank and to thus avoid drilling openings (see Patent EP 1 110 697 in the name of the Applicant).

It is furthermore known to use intermediate parts or connectors in order to achieve this fastening. Indeed, this way of proceeding makes it possible to easily fasten, to the tank, parts based on a material different to that which forms the inner surface of the tank. In order to do this it is sufficient to choose a connector made from a material which is compatible with that of the tank and to equip it with means for attachment to said accessory (fastening tabs, part of a "quick connect" type coupling, etc.).

Thus, Application U.S. Pat. No. 6,726,967 proposes a connector comprising a body, welding petals that open out in a flower shape from this body and a coupling mechanism (attachment means) for an accessory. However, this connector has several drawbacks:

it is bulky and reduces the working height of the tank in the (frequent) case where the accessory must be located in the gas pocket over the liquid (and not be submerged)

it is relatively heavy and adversely affects the weight of the tank (and by doing so, that of the vehicle for which it is intended)

a good welding quality requires a relatively complicated design of the welding petals.

SUMMARY

The present invention aims at solving these problems by providing a connector whose bulkiness and weight are reduced and which makes it possible to obtain a good welding quality despite a simple design.

For this purpose, the invention relates to a process for fastening an accessory to a hollow body obtained by molding a molten plastic parison and using a plastic connector comprising coupling means for the accessory and a stop surface intended to limit the penetration of the connector into the molten plastic, according to which the stop surface is provided with a curved double lip and the connector is welded to the inner wall of the parison using this double lip.

The use of such a double lip (or one-piece part having two concentric curved edges, i.e., two protuberances located preferably at its periphery, which are concentric and are in relief relative to the remainder of the part) makes it possible to double the bond strength of the weld, this being with little material and via a part that is easy to mold as one piece with, or to fasten to, the coupling. It should be noted that this lip does not necessarily have to be solid but may comprise slots or other openings/perforations of any shape. It should also be noted that it does not have to be circular either and that it in fact depends generally on the shape of the stop surface, since it is preferably located on the circumference of the latter.

The hollow body to which the invention applies is preferably a tank for a motor vehicle intended to contain fuel, a pollution-control additive or any other liquid on board the vehicle. It may be a fuel tank (FT) or a urea tank (urea being an additive that is used to purify the exhaust gases of $NO_R$). It applies particularly well to FTs.

BRIEF DESCRIPTION OF THE DRAWINGS

For a detailed description of the invention, reference will now be made to the accompanying drawing in which:

FIG. 1 illustrates a preferred connector geometry being that of a clip having fastening tabs that are intended to be inserted into an orifice of the accessory to be fastened and a cover which is in the form of a flat crown with a curved and tapered double edge.

DETAILED DESCRIPTION OF PREFERRED EMBODIMENTS

The term "FT" is understood to mean an impermeable tank, able to store fuel under diverse and varied usage and environmental conditions. An example of this tank is that with which motor vehicles are equipped.

The term "plastic" means any material comprising at least one synthetic resin polymer.

All types of plastic may be suitable. Particularly suitable are plastics that belong to the category of thermoplastics.

The term "thermoplastic" is understood to mean any thermoplastic polymer, including thermoplastic elastomers, and blends thereof. The term "polymer" is understood to mean both homopolymers and copolymers (especially binary or ternary copolymers). Examples of such copolymers are, without being limiting: random copolymers, linear block copolymers, other block copolymers and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion of their molecular weight.

In particular, polyolefins, thermoplastic polyesters, polyketones, polyamides and their copolymers may be used. A blend of polymers or copolymers may also be used; similarly it is also possible to use a blend of polymeric materials with inorganic, organic and/or natural fillers such as, for example, but without being limiting: carbon, salts and other inorganic derivatives, and natural or polymeric fibres. It is also possible to use multilayer structures composed of stacked and joined layers comprising at least one of the polymers or copolymers described above.

One polymer often employed is polyethylene. Excellent results have been obtained with high-density polyethylene (HDPE).

The wall of the tank may be composed of a single thermoplastic layer, or of two layers. One or more other possible additional layers may, advantageously, be composed of layers made of a material that is a barrier to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolysed ethylene/vinyl acetate copolymer). Alternatively, the tank may be subjected to a surface treatment (fluorination or sulfonation) for the purpose of making it impermeable to the fuel.

When the tank according to the invention is a fuel tank, it preferably comprises an EVOH-based barrier layer located between the HDPE-based outer layers.

Given that, according to the invention, the connector is welded to the inner wall of the parison using its double lip, it is preferably based on a plastic that is compatible with that of the tank (at least, the constituent materials of the surface of the two parts are preferably compatible), or even of the same nature. Therefore, preferably, the connector is based on HDPE when the tank comprises an outer HDPE-based layer.

According to the invention, the tank is produced by molding a parison. The term "parison" is understood to mean a generally extruded preform of molten plastic that is intended to form the wall of the tank after molding to the required shapes and dimensions. This preform does not necessarily have to be a one-piece preform.

Thus, advantageously, the parison is in fact made up of two separate pieces, which may be two sheets, for example. However, these pieces preferably result from cutting one and the same extruded tubular parison as described in the aforementioned application EP 1110697, the content of which is, for this purpose, incorporated by reference in the present application. According to this variant, once a single parison has been extruded, this parison is cut over its entire length, along two diametrically opposed lines, to obtain two separate portions (sheets).

Compared with the molding of two separately extruded sheets, of constant thickness, this approach allows the use of parisons having a variable thickness (that is to say a thickness that is not constant over their length), which are obtained by a suitable extrusion device (generally an extruder provided with a die having a positionally adjustable mandrel). Such a parison takes account of the reduction in thickness that occurs during molding at certain points on the parison, as a result of non-constant levels of deformation of the material in the mold.

After a parison has been molded in two pieces, these pieces generally form the lower and upper walls respectively of the fuel tank, each having an inner surface (pointed towards the inside of the tank) and an outer surface (pointed towards the outside of the tank).

The mold used in the process according to this variant of the invention preferably comprises a core, i.e. a part of suitable size and shape for being able to be inserted between the cavities of the mold when the parison is located therein and to fasten thereto the components inside the tank without the edges of the parison being welded (since the core must be removed before the final molding of the tank, a step during which the welding of the parison sections is carried out). Such a part (core) is, for example, described in patent GB 1 410 215, the content of which is for this purpose incorporated by reference into the present application.

This mold also preferably comprises two cavities that are intended to be in contact with the outer surface of the parison, the parison being molded by blow molding (pressing the parison against these cavities using a pressurized gas injected inside the parison) and/or by thermoforming (drawing a vacuum behind the mold cavities).

Preferably, it takes place by blow molding, but preferably while also providing suction (drawing a vacuum) behind the cavities to keep the parison in the mold when the latter is not closed and pressurized. Hence, it preferably comprises a degassing step prior to step (6) of the process that will be described below. Generally, in order to do this, the parison is first pierced (for example by puncturing it with a needle) and then the fluid is discharged from the mold (for example using a valve).

In the process according to the invention, the accessory is fastened to the inner surface of the parison by virtue of a connector, preferably after the parison has been pre-blown, i.e. stuck to the cavities of the mold. In the variant explained above, according to which the parison is in two sections and is molded using a mold comprising cavities and a core, this connector is advantageously welded to the inner wall of the parison using a device attached to the core that generally comprises an actuator.

Hence, one particularly preferred variant of the process according to the invention comprises the following steps:
1. the parison is introduced into the mold cavities;
2. the core is introduced inside the parison, said core having first been fitted with the accessory and its connector;
3. the mold is closed so that the cavities come into leaktight contact with the core;
4. the parison is pressed against the cavities by blowing through the core and/or applying a vacuum behind the cavities;
5. the accessory is fastened to the parison by welding the connector using a device attached to the core;
6. the mold is opened to withdraw the core;
7. the final molding of the parison is carried out by blow molding (by injecting a pressurized gas inside the parison) and/or thermoforming (by applying a vacuum behind the cavities).

The coupling mechanism between the connector and the accessory preferably makes it possible to provide a rapid connection between the two elements. This may be fastening tabs (preferably that are relatively flexible), a "fir-tree" connection, or any other type of quick connection. According to one preferred variant of the invention, the connector is in the form of a clip comprising fastening tabs that extend from a substantially flat plate comprising said stop surface. This plate preferably has a substantially circular cross section. Most particularly preferably this plate is hollow at its centre, i.e. it is in fact a flat crown (or flattened ring). This variant is particularly advantageous as it makes it possible to obtain a high bond strength of the connector with a minimum amount of material. Most particularly preferably, as it is very simple in design, the double lip is in fact made up of an extension of the outer and inner edges of the crown, these edges preferably being tapered (i.e. their thickness at the periphery is smaller than the thickness of the crown). Such a clip is particularly light and easy to mold, for example by injection molding.

One way of using such a clip consists in providing an orifice in the accessory (either directly during the manufacture thereof, or via subsequent machining, which is generally more practical) inserted through which is said clip, which will then be welded to the parison via its double lip, after having connected it to the edge of the orifice, for example using its fastening tabs, where appropriate, provided with a geometry suitable for this purpose.

The accessory in question in the context of the invention may be a valve, a swirl pot, a pump/gauge module (support), a liquid/vapour separation vessel, etc. It may in particular be a valve support, gauge support, swirl pot or a pump/gauge module support.

In the process according to the invention, the connector and the accessory are preferably attached using the coupling mechanism before the connector is welded to the parison. However, this is not necessarily the case when it is a question of components whose size and location are such that they can be mounted on the connector subsequently—for example: in the case of ventilation valves located near a maintenance orifice of the FT (for example: the orifice which is sealed by the mounting plate of a pump/gauge module).

The process according to the invention may use only a single connector as described above if the size and the weight of the accessory allow it, or several in the opposite case.

For bulky and/or large-sized objects, according to one advantageous variant of the invention, the accessory is fastened to the parison both by welding of the double lip of the connector and by snap riveting. This technique, which is common in the field of metallurgy, consists in molding a rivet in situ, from molten material that has been allowed to flow into and/or through an orifice of the part to be fastened and then that is left therein to solidify so as to form in situ a snap rivet or sort of rivet/bolt.

In this case, the double lip of the connector must be situated at such a location and have dimensions such that during the snap riveting it at least partially melts and enables the welding of the connector to be carried out.

According to one variant that is particularly preferred (since it reduces the distortions that may occur following the local compression of the material during snap riveting and/or following the shrinkage of the parison after it has cooled), the snap riveting takes place where a relief (a sort of dome) in the wall of the tank is located, which is concave when seen from the outside of the tank and convex when seen from the inside. In practice, this relief may be produced with the aid of a boss in the cavities of the mold. Its dimensions are dependent on the geometry of the tank and of the accessory, in particular in the area of the snap-riveting orifice. Generally, it has a diameter of a few centimetres, for example from 2 to 5 cm, and a height ranging from 1 to 15 mm, preferably from 2 to 8 mm. The snap-riveting orifice itself preferably has a diameter greater than 1 cm, even at least equal to 2 cm.

In this variant, the snap-riveting zone of the accessory is preferably set back relative to the stop surface of the connector so that, when the accessory is brought into contact with the parison in order to be fastened thereto, the snap riveting in the zone in relief (dome) and the welding take place simultaneously.

In the case where the tank according to the invention has a multilayer structure that includes a barrier layer, the dimensions and the shape of the lip are preferably such that the latter does not pierce the barrier layer. In particular, it is preferable that the protuberance does not protrude (does not stick out) by more than 2 mm, or even 1.5 mm relative to the surface of the accessory.

The present invention also relates to a plastic connector as described previously and that is in the form of a clip comprising fastening tabs that extend from a flat plate or crown provided with a double lip made up of an extension of its outer and inner edges, which are preferably tapered. Generally, this connector has a diameter of the order of cm, typically between 20 and 50 mm. Its thickness is generally of the order of mm, typically between 1 and 4 mm.

The appended FIG. 1 illustrates the invention in a non-limiting manner. In this FIGURE, the dimensions are given by way of example and identical numbers denote identical or similar components.

It in fact illustrates a preferred connector geometry, which is that of a clip having fastening tabs (1) that are intended to be inserted into an orifice of the accessory to be fastened (not represented) and a cover which is in the form of a flat crown (2") with a curved and tapered double edge (3") which doubles the bond strength of the weld (due to the double weld obtained).

The invention claimed is:

1. A process for fastening an accessory to a hollow body obtained by molding a molten plastic parison and using a plastic connector comprising coupling means for the accessory and a stop surface configured to limit the penetration of the connector into the molten plastic, wherein the stop surface is provided with a curved double lip, and wherein the connector is welded to the inner wall of the parison using the double lip.

2. The process according to claim 1, wherein the parison is made up of two separate pieces originating from one and the same extruded tubular parison that is cut over its entire length, along two diametrically opposed lines, and which is molded using a mold comprising cavities and a core, said process comprising the following steps:
    step 1. the parison is introduced into the mold cavities;
    step 2. the core is introduced inside the parison, said core having first been fitted with the accessory and its connector;
    step 3. the mold is closed so that the cavities come into leaktight contact with the core;
    step 4. the parison is pressed against the cavities blowing through the core and/or applying a vacuum behind the cavities;
    step 5. the accessory is fastened to the parison by welding the connector using a device attached to the core;
    step 6. the mold is opened to withdraw the core; and
    step 7. the final molding of the parison is carried out by blow molding and/or thermoforming.

3. The process according to claim 1, wherein the connector is in the form of a clip comprising fastening tabs that extend from a substantially flat plate comprising the stop surface.

4. The process according to claim 3, wherein the plate is in the shape of a flat crown or flattened ring.

5. The process according to claim 4, wherein the double lip is made up of an extension of the outer and inner edges of the crown, which are tapered.

6. The process according to claim 1, wherein the accessory is fastened to the parison both by welding of the double lip of the connector and by snap riveting.

7. The process according to claim 6, wherein the snap riveting takes place at a relief in the wall of the tank, which is concave when seen from the outside of the tank and convex when seen from the inside.

8. The process according to claim 7, wherein the parison is molded using a mold that comprises cavities and wherein the relief is made using a boss in these cavities.

9. The process according to claim 6, wherein the accessory comprises a rivet-punching zone which is set back relative to the stop surface of the connector.

* * * * *